United States Patent [19]
Walter

[11] 3,887,754
[45] June 3, 1975

[54] PARTICULATE EXPANDABLE STYRENE POLYMERS HAVING DESIRABLE PROCESSING PROPERTIES

[75] Inventor: Manfred Walter, Speyer, Germany

[73] Assignees: Badische Anilin- & Soda-Fabrik Aktiengesellschaft, Ludwigshafen (Rhine), Germany; Soda-Fabrik Aktiengesellschaft, Ludwigshafen/Rhine, Germany

[22] Filed: May 30, 1973

[21] Appl. No.: 365,217

[30] Foreign Application Priority Data
May 30, 1972 Germany................ 2226168

[52] U.S. Cl................. 428/407; 260/2.5 B; 264/53
[51] Int. Cl..................................... C09k 3/00
[58] Field of Search............117/100 C; 260/2.5 B, 260/45.9 NC; 264/53

[56] References Cited
UNITED STATES PATENTS

| | | | |
|---|---|---|---|
| 3,298,994 | 1/1967 | Krieger | 260/45.9 NC |
| 3,429,737 | 2/1969 | Marsden | 117/100 C |
| 3,461,088 | 8/1969 | Stahnecker | 264/53 |
| 3,637,538 | 1/1972 | Heald | 260/2.5 B |
| 3,663,466 | 5/1972 | Jablonski | 260/2.5 B |
| 3,763,059 | 10/1973 | Needham et al. | 260/2.5 B |
| 3,793,242 | 2/1974 | Slavsky | 117/100 C |

FOREIGN PATENTS OR APPLICATIONS

| | | | |
|---|---|---|---|
| 1,005,119 | 9/1965 | United Kingdom | 260/2.5 B |

*Primary Examiner*—William D. Martin
*Assistant Examiner*—Dennis C. Konopacki
*Attorney, Agent, or Firm*—Johnston, Keil, Thompson & Shurtleff

[57] ABSTRACT

Particulate expandable styrene polymers having a short minimum mold resistance time and characterized by a coating of an amide of phthalic acid, dihydrophthalic acid or tetrahydrophthalic acid.

4 Claims, No Drawings

PARTICULATE EXPANDABLE STYRENE POLYMERS HAVING DESIRABLE PROCESSING PROPERTIES

BACKGROUND OF THE INVENTION

This invention relates to novel coating substances for expandable particulate polystyrenes, which coating substances cause no impairment of the storage properties of the polystyrene whilst making it possible to produce very fast-cooling moldings showing an even density distribution over the entire molding and good fusion of the polystyrene particles. The water absorption of the moldings during molding is considerably reduced.

The manufacture of shaped articles from foamed styrene polymers is well known. The most commonly used industrial procedure consists in heating the foamable polymer particles containing expanding agent in a first stage at a temperature above their softening point sufficiently long to cause foaming of the particles so that loose bulk material having a desired bulk density is produced. This operation is known as pre-expansion or prefoaming. A very important factor concerning the processability of an expandable styrene polymer is that the individual particles should not fuse together during prefoaming to form large agglomerates. This is because such agglomerates impair the transportability of the prefoamed material and make mold charging more difficult or even impossible. The prefoamed material is stored for a number of hours and then further foamed in a perforated pressuretight mold by renewed heating with superheated steam so as to cause fusion of the particles to form a molding of dimensions corresponding to those of the mold cavity. This second operation is known as molding. Following molding, the shaped article must remain in the mold for cooling. This must be continued until the interior of the shaped article has reached a temperature below the softening point of the styrene polymer. If the article is removed from the mold too soon, it may be deformed or completely spoiled. Obviously, long cooling times increase production costs.

It is known that foaming of particulate styrene polymers containing expanding agents and surface-coated with small amounts of an organic compound capable of dissolving or swelling the styrene polymer produces shaped articles which may be removed from the mold after relatively short cooling times. However, this process has various drawbacks, of which the most important is that the said coating causes a very rapid loss of expanding agent from the foamable styrene polymer, which is thus no longer storable.

It is also known that foamed articles may be advantageously made by heating prefoamed particulate expandable styrene polymers which have been coated with small amounts of organic compounds which are homogeneously miscible with the styrene polymer and have boiling points above 95°C. Although short mold cooling times are achieved, this process entails an additional processing step.

It is further known that short cooling times in the manufacture of molded articles using expandable styrene polymers are achieved if the particulate expandable styrene polymer is coated with a small amount of an acid amide of the general formula RCONHR', where R denotes an aliphatic hydrocarbon radical of from 10 to 24 carbon atoms and R' is preferably hydrogen but may also be methyl, ethyl, n-propyl or isopropyl. The melting point of the acid amide should be between 35° and 115°C.

The cooling times in the mold in the last-named process have a length which is only from 20 to 70% that of the cooling times required for molded articles of uncoated starting material. However, these very short cooling times provide no uniform distribution of density over the molding, or inversely, a uniform density distribution can only be achieved with longer cooling times.

Furthermore, the oleic amide named as being particularly suitable in the prior art process causes a not inconsiderable increase in the loss of foaming agent from the expandable polystyrene, with the result that the storability of the polystyrene is greatly diminished.

SUMMARY OF THE INVENTION

We have now found, surprisingly, that foamed articles may be made from expandable polystyrene in a particularly advantageous manner if the expandable styrene polymer is coated with an acid amide of the general formula

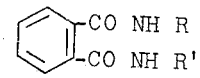

where apart from phthalic acid use may also be made of dihydrophthalic acid or tetrahydrophthalic acid as dicarboxylic acid component and where R and R' are aliphatic hydrocarbon radicals of from eight to 22 carbon atoms.

R and R' are preferably saturated but they may also be unsaturated; they are preferably linear but may also be branchedchain radicals. The melting point of the acid amide is between 50° and 110°C. If desired, mixtures of appropriate acid amides having a mixed melting point in the range stated may be used, although the melting point of any one component of the mixture may lie outside the said range of melting points. The amount of coating substance required is small and is usually between 0.05 and 2% and preferably between 0.1 and 0.6%. The cooling times achieved in the process of the invention are from 10 to 50% and normally from 15 to 35% the length of the cooling times required when uncoated expandable styrene polymers are used.

Expandable styrene polymers which have been coated in accordance with the present process further give moldings in which the densities of small volumes taken from all parts of the molding are virtually equal. This is of very great importance for the manufacture of foamed panels from blocks, where certain minimum densities must be guaranteed.

Another advantage of the process of the invention is the fact that when moldings are made using steam the water absorption is considerably less than that occurring in the case of moldings made from uncoated expandable styrene polymer.

The coating may also contain other materials for imparting specific properties to the expandable polystyrene, for example antistatic agents, flame-proofing agents and/or antisticking agents for prefoaming, e.g. zinc stearate or melamine/formaldehyde condensates.

DESCRIPTION OF PREFERRED EMBODIMENTS

Styrene polymers used in the present invention are polystyrene and copolymers of styrene with other α β-unsaturated compounds, which compounds contain at least 50% by weight of polymerized units of styrene. Examples of suitable comonomers are α-methylstyrene, nuclear halogenated styrenes, nuclear alkylated styrenes, acrylonitrile, acrylates and methacrylates of alcohols of from one to eight carbon atoms, N-vinyl compounds such as vinyl carbazole, maleic anhydride and also small amounts of compounds containing two polymerizable double bonds such as butadiene, divinyl benzene and butanediol diacrylate. The styrene polymers may contain additives such as flame-proofing agents, e.g. tris-dibromopropyl phosphate, hexabromocyclododecane, chloroparaffin and synergistic agents for flame-proofing agents such as ferrocene, high temperature decomposing organic peroxides, and also dyes, lubricants and any desired fillers. The styrene polymers may also contain nucleating agents for achieving a fine cell structure.

The particulate styrene polymers are made by conventional methods. They may be produced in bead form, in the form of cylindrical granules or in the form of crumbs such as are obtained when mass polymers are ground. The particles advantageously have diameters of from 0.1 to 6 mm and in particular of from 0.4 to 3 mm.

The styrene polymers contain one or more expanding agents evenly distributed therein. Suitable expanding agents are, for example, normally gaseous or liquid hydrocarbons or halohydrocarbons which are non-solvents for the styrene polymer and have boiling points below the softening point of the polymer. Suitable expanding agents are for example propane, butane, pentane, cyclopentane, hexane, cyclohexane, dichlorodifluoromethane and trifluorochloromethane. The expanding agents are contained in the styrene polymers generally in amounts of from 3 to 15%, by weight of the polymer.

The particulate styrene polymers are prefoamed to from 10 to 100 times their original volume by known methods, for example by treatment of the expanding agent-containing particles with a stream of steam. Stage II foaming of the particulate prefoamed styrene polymers is carried out in non-gas-tight molds. By non-gas-tight molds we mean molds from which gases such as air may escape without egress of the foaming polymer. The prefoamed particles are conveniently heated with steam or mixtures of steam and air. The procedures of prefoaming and molding of styrene polymers are described, for example in papers by F. Stastny in "Kunststoffe" 44th year, 1954, pp. 173–180, and in "Der Plastverarbeiter" 1954, pp. 260–271.

Examples of coating substances which have been found particularly suitable for use in the present invention are substances such as phthalic distearyl amide, phthalic dilauryl amide, phthalic dioleyl amide, tetrahydrophthalic distearyl amide, tetrahydrophthalic dilauryl amide and dihydrophthalic distearyl amide.

The acid amide should have a melting point of between 50° and 110°C and preferably between 60° and 95°C. It is also possible to use mixtures of amides having a mixed melting point within the said range, although the melting points of the individual components may lie outside said range.

At least the major portion of the acid amide is present in the form of a coating on the surface of the particulate expandable polystyrene in substantially uniform distribution thereon. The method of application is not critical and may take the form, for example, of tumbling of particulate acid amide powder onto the particulate expandable styrene polymer in conventional mixers. Alternatively, the acid amide may be applied from an aqueous dispersion or a solution in an organic solvent followed by removal of the water or solvent respectively. Another possibility is to add the amide to a bead polymerization batch at the end or toward the end of suspension polymerization.

The acid amide or amides may be applied to the particulate expandable polystyrene either alone or in admixture with other substances such as antistatic agents, dyes, flame-proofing agents, flow improvers and antisticking agents for prefoaming. It is also possible to apply various coating substances sequentially.

The amount of acid amide or amides used is from 0.05 to 2% and preferably from 0.1 to 0.6%. This amount is particularly dependent on the particle size of the particulate expandable polystyrene, since small particles have correspondingly larger specific surface areas and thus a greater amount of coating substance is required for a given rate of application of acid amide per unit of surface area.

We have found that the particulate expandable styrene polymers which have been coated according to the process of the invention show advantages in processing over the same particulate expandable styrene polymers in the uncoated state or the same particulate expandable styrene polymers when coated according to a prior art process.

The cooling times of moldings made from styrene polymers coated in accordance with the present invention are very short. Their duration is from 10 to 50% and normally from 15 to 35% of that required by moldings made from the same particulate expandable styrene polymers when uncoated. Clearly the reduction in cooling time is particularly dependent on the amount of coating substance used.

These cooling times are determined by the following method. The perfoamed styrene polymers are foamed to completion in a mold at the center of which there is a pressure-sensitive probe. The time is measured from the commencement of cooling to the point at which the pressure in the interior of the molding has fallen to 0.1 atmosphere gage. It has been found that at this pressure the molding may be removed from the mold with no risk of damage.

Moldings made from particulate expandable styrene polymers do not normally exhibit the same density at all points but the density distribution is such that in the regions near the surface of the molding the density is much higher than in regions nearer the center of the molding. This may mean that the density in said marginal regions is twice as great as in the interior. In such a case, panels cut from blocks of foamed material will have different densities, which is highly undesirable as regards price and quality.

Particulate expandable styrene polymers coated in accordance with the present invention have been found to give molded articles which show virtually no variations in density.

For the purposes of characterizing the density distribution of a foamed block having the dimensions 100 × 100 × 50 cm, a smaller block measuring 15 × 15 × 50 cm is cut from center to center of the large sides and is then subdivided into ten portions measuring 15 × 15

×5 cm. The density of each of these ten portions is determined and in this way there is obtained the density distribution from the center of one large side to the other large side of the original block. Two dimensions are used for characterizing the resulting density distribution curves, these being the percentage density excess and the density differential, as defined below:

$$\% \text{ density excess} = \frac{\text{mean density of 10 portions minus density of lightest portion}}{\text{density of lightest portion}} \times 100$$

$$\text{density differential} = \frac{\text{density of heaviest minus density of lightest portion}}{\text{mean density}}$$

The percentage density excess indicates the percentage by which a panel manufacturer must raise the original quantity or bulk density of prefoamed particulate expandable styrene polymer used if he wishes to quarantee a specific minimum density for the lightest panel. The density differential is a measure of the difference between the heaviest and lightest panels divided by the mean density.

When prefoamed styrene polymers are foamed to completion in the mold using steam, the moldings absorb a certain amount of water and this has to be removed from the moldings by drying before they are used or processed further.

It is found that in the manufacture of molded articles from styrene polymers which have been coated in accordance with the present invention, this water absorption is greatly reduced, the amount of the reduction being from 30 to 70%.

The water content in the molding is given by the difference between the weight of the prefoamed styrene polymer introduced into the mold and the weight of the molding immediately after its removal from the mold.

The coatings provided in the present invention also have a certain antisticking action during prefoaming, i.e., they prevent the formation of large agglomerates of polystyrene particles during prefoaming. This is important, since such agglomerates make transport of the prefoamed material and charging of the mold therewith more difficult or even impossible. The degree of adhesion is given as that percentage by weight of the pre-foamed material which is retained by a sieve having a mesh width of 20 mm.

The styrene polymers coated in accordance with the present invention show no greater loss of pentane than the uncoated material during storage and are thus equally well storable.

The moldings made from the styrene polymers coated in accordance with the invention show good fusion of the polymer particles and are dimensionally stable.

EXAMPLE 1

An expandable polystyrene made by bead polymerization and consisting of beads having a diameter of from 1.3 to 2.3 mm and containing 5.5% of pentane was coated in a mixer with 0.3% of its weight of an acid amide as listed below. The acid amide had been finely pulverized and passed through a sieve having a mesh width of 0.1 mm. The coated expandable polystyrene was stored in a closed vessel for 24 hours. The material was then prefoamed with steam to a bulk density of approx. 15 g/l in a continuous, stirred prefoamer. The prefoamed material was stored for 24 hours and then foamed to completion in an automatic 500 l block mold, steaming being effected for 20 sec. with steam at a pressure of 0.8 at. gage. The resulting foamed block had an average of 3 cells/mm.

In the comparative experiments the above procedure was followed except that the following coating substances were used in place of those proposed in the present invention: none, stearic amide, oleic amide, palmitic amide and 12-hydroxystearamide. The results of the test series are given in Table 1 below.

TABLE 1

| Coating substance | cooling time of block [min] | density [g/l] | % density excess [%] | density differential | loss of pentane on storage | water content of molding [%] |
| --- | --- | --- | --- | --- | --- | --- |
| none | 80 | 15.4 | 14.0 | 0.38 | normal | 10.1 |
| stearic amide | 36 | 15.2 | 7.0 | 0.16 | normal | 6.4 |
| oleic amide | 17 | 15.1 | 11.1 | 0.37 | above normal | 11.0 |
| palmitic amide | 34 | 15.3 | 6.4 | 0.19 | normal | 8.1 |
| 12-hydroxy-stearamide | 38 | 15.7 | 5.8 | 0.19 | above normal | 8.8 |
| phthalic di-stearamide | 14 | 15.0 | 6.1 | 0.11 | normal | 6.3 |
| phthalic di-lauryl amide | 13 | 14.9 | 4.5 | 0.9 | normal | 7.1 |
| phthalic dioleyl amide | 12 | 15.3 | 6.2 | 0.12 | normal | 7.3 |
| phthalic 2-ethylhexyl-amide | 12 | 14.8 | 4.3 | 0.8 | normal | 5.9 |
| tetrahydrophthalic behenyl amide | 16 | 15.2 | 5.5 | 0.9 | normal | 5.7 |
| tetrahydrophthalic distearyl amide | 14 | 15.3 | 5.9 | 1.0 | normal | 6.1 |

EXAMPLE 2

Example 1 was repeated except that different quantities of coating substance, i.e., 0.2% and 0.1% thereof, were used. The coating substances used were phthalic distearyl amide and, for comparison, oleic amide.

TABLE 2

| Coating | phthalic distearyl amide | phthalic distearyl amide | oleic amide | oleic amide |
|---|---|---|---|---|
| Amount [%] | 0.2 | 0.1 | 0.2 | 0.1 |
| Cooling time of block [min] | 27 | 32 | 32 | 55 |
| Density [g/l] | 17.6 | 18.2 | 19 | 17.6 |
| Density excess [%] | 6.0 | 8.3 | 5.5 | 9.5 |
| Density differential | 0.11 | 0.22 | 0.16 | 0.33 |
| Loss of pentane on storage | normal | normal | above normal | slightly above normal |
| Water content of molding [%] | 3.4 | 4.3 | 8 | 6.8 |

EXAMPLE 3

An expandable polystyrene made by extrusion granulation of a polystyrene melt containing 5% of pentane and consisting of slightly deformed cylinders having diameters of 2 mm and lengths of from 2 to 4 mm was coated in a mixer with 0.3% of its weight of phthalic distearyl amide. The acid amide had been finely pulverized and passed through a sieve having a mesh width of 0.1 mm. The coated expandable polystyrene was stored for 24 hours in a closed vessel. The material was then prefoamed to a bulk density of approx. 21 g/l in a continuous, stirred prefoamer using steam. The prefoamed material was stored for 24 hours and then foamed to completion in an automatic 500 l block mold, steaming being effected for 20 seconds with steam at a pressure of 0.8 at. gage. The resulting foamed block had an average of 2 cells/mm. In two comparative experiments, the phthalic distearyl amide was replaced by stearic amide in one case and no coating was used at all in the other case. The loss of expanding agent during storage of the unfoamed beads was normal in all cases. The results are listed in Table 3 below.

TABLE 3

| Coating | none | 0.3% of phthalic distearyl amide | 0.3% of stearic amid |
|---|---|---|---|
| Cooling time [min] | 170 | 45 | 120 |
| Cooling time [%] | 100 | 27 | 70 |
| Density [g/l] | 20.8 | 21.8 | 22.4 |
| Density excess [%] | 24.6 | 7.4 | 22.3 |
| Density differential | 0.63 | 0.20 | 0.57 |
| Pentane loss on storage | normal | normal | normal |
| Water content of molding [%] | 10 | 6.2 | 6.5 |
| Adhesion during stage I foaming [%] | 1.0 | 0.0 | 1.7 |

EXAMPLE 4

An expandable styrene/acrylonitrile copolymer containing 1.5% by weight of acrylonitrile and made by extrusion granulation of an appropriate pentane-containing polymer melt, which copolymer contained 5.5% of pentane and consisted of slightly deformed cylinders having diameters of 1.5 m and lengths of from 2 to 4 mm, was coated in a mixer with 0.3% of its weight of tetrahydrophthalic dilauryl amide. The Example was continued as described in Example 3, similar comparative tests also being made. The resulting foamed blocks had an average of 3.1 cells/mm. The results are shown in Table 4 below.

TABLE 4

| Coating | none | 0.3% of tetrahydrophthalic dilauryl amide | 0.3% of stearic amide |
|---|---|---|---|
| Cooling time [min] | 87 | 22 | 64 |
| Cooling time [%][1] | 100 | 25 | 73 |
| Density [g/l][2] | 15.3 | 15.5 | 14.9 |
| Density excess [%] | 19.1 | 7.8 | 15.3 |
| Density differential | 0.45 | 0.22 | 0.35 |
| Loss of pentane on storage | normal | normal | normal |
| Water content of molding [%][3] | 10.3 | 5.9 | 6.7 |

[1]with reference to the material time of the uncoated material
[2]average taken over the entire block
[3]immediately after removal of the mold.

I claim:

1. Particulate expandable styrene polymers having short minimum residence times in the mold and having a coating of from 0.05 to 2% by weight of a carboxamide melting between 50° and 110°C and having the formula

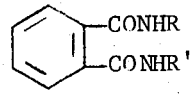

wherein the acid component is selected from the group consisting of dihydrophthalic acid, tetrahydrophthalic acid and phthalic acid and wherein R and R' are alkyl groups of from eight to 22 carbon atoms.

2. Particulate expandable styrene polymers as set forth in claim 1 wherein the amount of said coating is from 0.1 to 0.6%.

3. Particulate expandable styrene polymers as set forth in claim 1 wherein said polymers have a particle diameter of from 0.1 to 6 mm.

4. Particulate expandable styrene polymers as set forth in claim 1 wherein said polymers have a particle diameter of from 0.4 to 3 mm.

* * * * *